United States Patent
Spiess

(10) Patent No.: US 6,232,871 B1
(45) Date of Patent: *May 15, 2001

(54) MOTOR VEHICLE HAVING A STEERING WHEEL, A TRANSPONDER-COMMUNICATION DEVICE AND A TRANSMISSION COIL

(75) Inventor: Bernhard Spiess, Graz (AT)

(73) Assignee: U. S. Philips Corporation, New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/009,745

(22) Filed: Jan. 20, 1998

(30) Foreign Application Priority Data

Jan. 21, 1997 (EP) .................................................. 97890009

(51) Int. Cl.[7] ...................................................... H04Q 5/22
(52) U.S. Cl. ....................... 340/10.4; 340/10.1; 340/10.2; 340/825.69; 340/825.72; 340/572.7; 307/10.5
(58) Field of Search ........................ 340/825.54, 825.31, 340/825.69, 825.72, 10.2, 10.4, 10.1, 825.3; 180/287; 307/10.5

(56) References Cited

U.S. PATENT DOCUMENTS

| 4,973,958 | | 11/1990 | Hirano et al. ......................... 340/825 |
| 5,134,392 | | 7/1992 | Takeuchi et al. ..................... 340/825 |
| 5,382,948 | * | 1/1995 | Richmond ....................... 340/825.31 |
| 5,596,234 | * | 1/1997 | Umeda et al. ................... 340/825.69 |
| 5,867,093 | * | 2/1999 | Dodd et al. ........................... 340/461 |
| 5,869,908 | * | 2/1999 | Moczygemba et al. ............. 180/187 |
| 5,929,769 | * | 7/1999 | Garnault .......................... 340/825.31 |

* cited by examiner

Primary Examiner—Brian Zimmerman
Assistant Examiner—Yves Dalencourt

(57) ABSTRACT

A vehicle has a steering wheel for steering the vehicle. The vehicle further has a transponder communication device for contactless communication with a transponder. The transponder communication device detects first control information that is stored in the transponder, compares the first control information with second control information that is stored in the transponder communication device, and generates a vehicle control signal if the first control information corresponds to the second control information. The transponder communication device receives the first control information in a transponder signal. The vehicle has a coil responsive to said transponder signal. The steering wheel has a peripheral ring portion. The coil is included within the peripheral ring portion of the steering wheel.

13 Claims, 2 Drawing Sheets

MOTOR VEHICLE HAVING A STEERING WHEEL, A TRANSPONDER-COMMUNICATION DEVICE AND A TRANSMISSION COIL

BACKGROUND OF THE INVENTION

The invention relates to a motor vehicle having a steering wheel and having a transponder communication device, which device is designed for the contactless communication with at least one transponder, which transponder causes control information to be supplied to the motor vehicle, and having a transmission coil adapted to receive transponder signals which each contain at least one type of control information, which coil is arranged in the interior of the motor vehicle, is mechanically connected to a part of the motor vehicle and is electrically connected to the transponder communication device, which device is adapted to detect identification information representing at least a part of a received transponder signal.

Such a motor vehicle of the type defined in the opening paragraph is known from, for example, the document U.S. Pat. No. 5,134,392 A. In this known motor vehicle the transmission coil is accommodated in a cavity of the driver's door of the motor vehicle. This location gives rise to some problems, such as the fact that the transmission coil is exposed to a comparatively strong extent to the effects of moisture and, in some cases, to temperature effects, that a comparatively long and intricate arrangement of the connecting leads between the transmission coil and the transponder-communication device is required, and that the transmission coil and the connecting leads are likely to be damaged in the event of an accident.

SUMMARY OF THE INVENTION

It is an object of the invention to preclude the aforementioned problems and to improve a motor vehicle of the type defined in the opening paragraph in a simple manner. In order to achieve this object in a motor vehicle of the type defined in the opening paragraph, the transmission coil is mechanically connected to the peripheral ring portion of the steering wheel and has a ring shape adapted to the ring part. As a result of this, it is achieved in a very simple and cheap manner that the transmission coil is hardly exposed to unfavorable environmental influences, that the transmission coil is arranged in the motor vehicle in a well protected manner, and that the connecting leads between the transmission oil and the transponder-communication device can be simple and comparatively short. As a result of the mechanical connection of the transmission coil to the peripheral ring portion of he steering wheel it is further achieved that the transmission coil has a larger diameter corresponding to the diameter of the peripheral ring portion and consequently has a larger magnetic-flux linkage area, so that the transmission coil has the advantage of a high transmission field strength and a high reception sensitivity and, consequently, a contactless communication is also possible with a transponder situated outside the motor vehicle. Moreover, the ring shape of the transmission coil has the advantage that a homogeneous field configuration is obtained in the case of transmission by means the transmission coil. A further advantage of the mechanical connection of the transmission coil to the peripheral ring portion of the steering wheel is that the transmission coil is thus positioned correctly with respect to the driver, thus guaranteeing a particularly good contactless communication with a transponder present in the driver's clothing. Owing to the comparatively large diameter of the transmission coil connected to the peripheral ring portion of the steering wheel it is further achieved that a proper contactless communication is also possible with a transponder situated in a backseat area. It is to be noted that such a transponder, by means of which the motor vehicle can be controlled with the aid of control information, i.e. by means of which for example the authorization to use the motor vehicle can be verified or detected, can take the form of a credit card or a key. Moreover, it is to be noted that the transpondercommunication device and the transmission coil may form part of an authorization verification system by means of which the authorization to use the motor vehicle can be verified, which authorization verification system can be designed as an access control system by means of which the access through at least one door to a a space in the motor vehicle can be controlled, but also as a start control system by means of which it is possible to control starting of the engine of the motor vehicle.

It is to be noted that it is known per se to arrange or accommodate transmission coils or antennas at various locations in a motor vehicle. This can be, for example, at the location of the wind-shield at the front but also at the location of the rear window of a motor vehicle. Furthermore, this can be at the location of the steering column of a motor vehicle and in the driver's seat or in the co-driver's seat. It is also know to arrange an antenna or a transmission coil at the location of the roof of a motor vehicle.

In a motor vehicle in accordance with the invention it has proved to be particularly advantageous if the transmission coil has been molded into the peripheral ring portion of the steering wheel. In this way, a particularly well-protected mounting of the transmission coil is achieved.

In a motor vehicle in accordance with the invention it has further proved to be very advantageous if the transmission coil has two connecting leads, which each extend from the peripheral ring portion of the steering wheel to a hub portion of the steering wheel through at least one spoke of the steering wheel. In this way, a very simple electrically conductive connection between the transmission coil and the transponder-communication device is possible.

The above-mentioned as well as further aspects of the invention will become apparent from the embodiment described hereinafter by way of example and will be elucidated by means of this embodiment.

BRIEF DESCRIPTION OF THE DRAWING

The invention will now be described in more detail with reference to the drawing, which shows an embodiment to which the invention is not limited.

DESCRIPTION OF THE PREFERRED EMBODIMENTS

Figure 1:
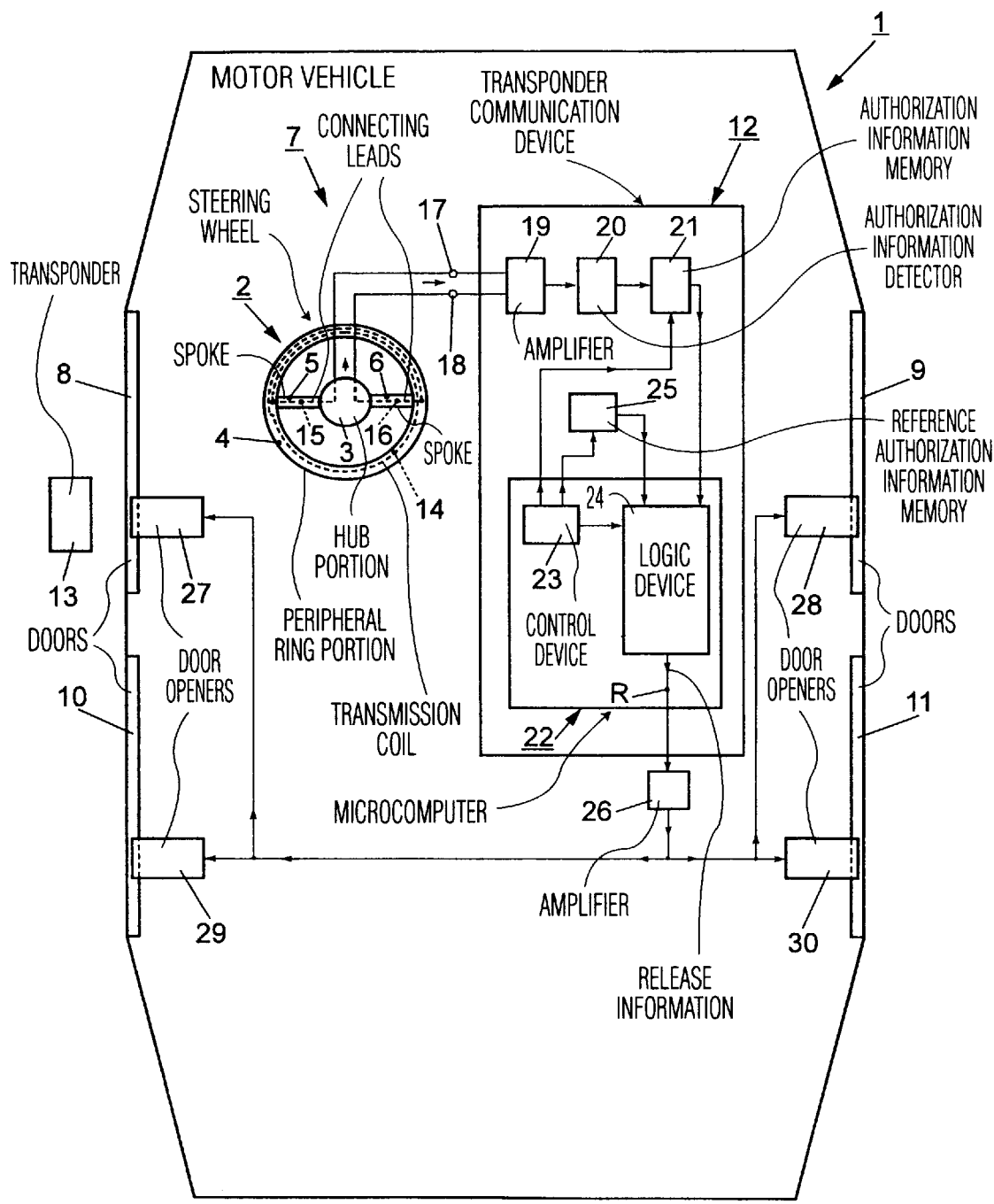
FIG. 1 is a highly diagrammatical plan view of a motor vehicle having a steering wheel and an authorization verification system, whose transmission coil is mechanically connected to the peripheral ring portion of the steering wheel.

FIG. 1 shows a motor vehicle 1 in a highly diagrammatical manner. The motor vehicle 1 has a steering wheel 2. The steering wheel 2 has an inner hub portion 3, which is connected to the steering column, not shown, of the motor vehicle 1, and a peripheral ring portion 4, the ring portion 4 being mechanically coupled to the hub portion 3 by means of two spokes 5 and 6. In the present case the whole steering wheel 2 is made of a stable plastic.

The motor vehicle 1 further comprises an authorization verification system 7. In the present case the authorization verification system 7 is constructed as an access control system by means of which the access to the passenger compartment in the motor vehicle 1 via the four doors 8, 9, 10 and 11 can be controlled.

The authorization verification system 7 of the motor vehicle 1 comprises a transponder-communication device 12 designed for the contactless communication with at least one transponder, which transponder causes control information, i.e. authorization information, to be supplied to the motor vehicle 1 and in the present case controls the access authorization through the doors 8, 9, 10 and 11 by means of authorization information. Such a transponder 13, which takes the form of a card, is shown diagrammatically in FIG. 1 next to the driver's door 8. The authorization verification system 7 of the motor vehicle 1 further comprises a transmission coil 14 adapted to receive transponder signals which each contain at least one type of control information, i.e. authorization information. The transmission coil 14 is arranged in the interior of the motor vehicle 1 and is mechanically connected to a part of the motor vehicle 1.

In the present case of the motor vehicle 1 shown in FIG. 1 the transmission coil 14 is mechanically connected to the peripheral ring portion 4 of the steering wheel 2 in an advantageous manner, i.e. the transmission coil 14 has been molded into the peripheral ring portion 4 of the steering wheel 2. The transmission coil 14 has a ring-shape adapted to the ring portion 4, which is also advantageous.

The transmission coil 14 is electrically connected to two inputs 17 and 18 of the transponder-communication device 12 via two connecting leads 15 and 16, which each extend from the peripheral ring portion 4 of the steering wheel 2 to the hub portion 3 of the steering wheel 2 through one of the two spokes 5 and 6 of the steering wheel 2 and which subsequently pass through the steering column of the motor vehicle 1 in a manner not shown. The two connecting leads 15 and 16 can also be passed through only one of the two spokes 5 and 6 of the steering wheel 2.

The transponder-communication device 12 is adapted to detect identification information representing at least a part of a received transponder signal. In the present case the authorization information contained in a received transponder signal can be detected. For this purpose, the transponder-communication device 12 comprises an amplifier 19 which is connected to the two inputs 17 and 18 and which amplifies the transponder signals supplied by the transmission coil 14. The amplifier 19 is followed by an authorization information detector 20 by means of which the authorization information in a transponder signal, which information is formed for example by a code, can be determined or detected. Authorization information detected by means of the authorization information detector 20 can be stored as identification information in an authorization information memory 21 which follows the authorization information detector 20. However, alternatively it is possible to generate identification information derived from the detected authorization information.

The transponder-communication device 12 further includes a microcomputer 22. By means of the microcomputer 22 a control device 23 is realized. Moreover, a logic device 24 is realized by means of the microcomputer 22.

The transponder-communication device 12 further includes a reference authorization information memory 25, which can store or stores reference authorization information. In the case that generated identification information is derived from the authorization information detected by means of the authorization information detector 20 corresponding reference identification information is stored or can be stored in the reference authorization information memory 25.

By means of the control device 23 of the microcomputer 22 it is possible to generate control information and to apply this information to the authorization information memory 21, to the reference authorization information 25 and to the logic device 24. When the control information is applied from the control device 23 to the two memories 21 and 25 the authorization information, stored as identification information in the authorization information memory 21 and originally supplied by the transponder 13 located outside the motor vehicle 1—upon an appropriate request from the transponder communication device 12, but this will not be described here in any further detail because it is not essential in the present case—and the reference authorization information, stored as reference identification information in the reference authorization information memory 25, are applied to the logic device 24 of the microcomputer 22. The logic device 24, which is also controlled by control information from the control device 23, compares the authorization information originally supplied by the transponder 13 located outside the motor vehicle 1 and subsequently supplied by the authorization information memory 21 with the reference authorization information supplied by the reference authorization information memory 25. When both types of information correspond, the logic device 24 of the microcomputer 22 of the transponder communication device 12 supplies release information R to an amplifier 26. The amplified and, if necessary, converted release information R is applied from the amplifier 26 to four door openers 27, 28, 29 and 30, each associated with one of the doors 8, 9, 10 and 11, and causes the door openers 27, 28, 29 and 30 to be activated, as a result of which the doors 8, 9, 10 and 11 of the motor vehicle 1 are opened by means of the door openers 27, 28, 29 and 30.

The motor vehicle 1 described above with reference to FIG. 1, in which the transmission coil 14 has been molded into the peripheral ring portion 4 of the steering wheel 14, has the advantage that transmission coil 14 accommodated inside the peripheral ring portion 4 of the steering wheel 2 is effectively protected against environmental influences, that only a comparatively simple and short wiring from the transmission coil 14 to the transponder communication device 12 is required, and that the transmission coil 14 has a large diameter corresponding to the diameter of the peripheral ring portion 4 and consequently has a larger magnetic-flux linkage area, so that the transmission coil 14 has the advantage of a high transmission field strength and a high reception sensitivity and, consequently, a contactless communication is also guaranteed with a transponder 13 situated outside the motor vehicle 1. Moreover, the ring shape of the transmission coil 14 has the advantage that a homogeneous field configuration is obtained in the case of transmission by means the transmission coil 14. A further advantage obtained by arranging the transmission coil 14 in the peripheral ring portion 4 of the steering wheel 2 is that the transmission coil 14 is positioned opposite to the driver, thus guaranteeing a particularly good contactless communication with a transponder 13 present in the driver's clothing. The large diameter of the transmission coil 14 as a result of the arrangement of the transmission coil 14 in the peripheral ring portion 4 of the steering wheel 2 further has the advantage that a proper contactless communication is also possible with a transponder situated in a backseat area.

In the embodiment of a motor vehicle 1 described by way of example with reference to FIG. 1, the authorization verification system 7 forms an access control system. However, such an authorization verification system can be also designed as a start control system by means of which it is possible to verify the authorization to start the engine of a motor vehicle in accordance with the invention. Finally, it is to be noted that a transponder communication device of a motor vehicle in accordance with the invention can also have another circuit design than in the embodiment of a motor vehicle 1 in accordance with the invention described by way of example with reference to FIG. 1.

Figure 2:
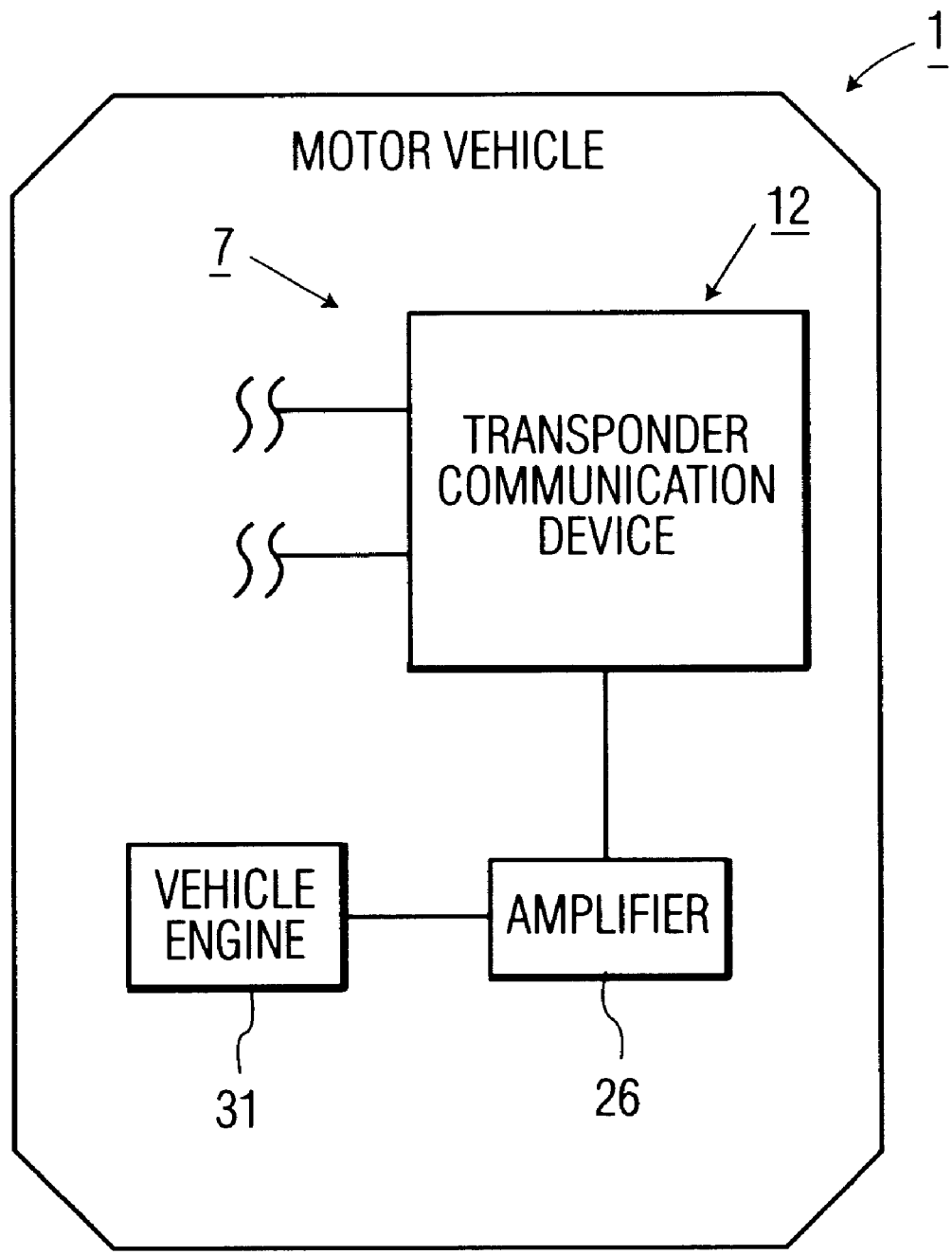
FIG. 2 shows an embodiment of the motor vehicle according to the invention wherein the authorization verification system is intended for vehicle engine start control.

FIG. 2 shows an embodiment of the motor vehicle according to the invention wherein the authorization verification system is intended for vehicle engine start control. To this end, the amplifier 26 is connected to a vehicle engine 31 comprised in the motor vehicle 1.

What is claimed is:
1. A vehicle comprising:
   a transponder communication device for contactless communication with a transponder, said transponder communication device being configured to detect first control information stored in said transponder, to compare said first control information with second control information stored in said transponder communication device, and to generate a vehicle control signal if said first control information corresponds to said second control information, and said transponder communication device receiving said first control information in a transponder signal;
   a steering wheel for steering said vehicle, said steering wheel having a peripheral ring portion; and
   a coil responsive to said transponder signal, said coil being comprised within said peripheral ring portion.
2. A vehicle as claimed in claim 1, wherein said coil has a ring-shaped form corresponding to a shape of said peripheral ring portion.
3. A vehicle as claimed in claim 1, said vehicle further comprising a door, and a door opener, said vehicle control signal controlling said door opener.
4. A vehicle as claimed in claim 1, said vehicle further comprising a vehicle engine, said vehicle control signal controlling starting of said vehicle engine.
5. A vehicle as claimed in claim 1, wherein said coil has been molded into said peripheral ring portion.
6. A vehicle as claimed in claim 1, wherein said steering wheel has a hub portion, and at least one spoke mechanically coupling said hub portion to said peripheral ring portion, and wherein said coil has two connecting leads for connecting said coil to said transponder communication device, said connecting leads extending from said peripheral ring portion to said hub portion through said at least one spoke.
7. A steering wheel for steering a vehicle, said vehicle having a transponder communication device for contactless communication with a transponder, said transponder communication device being configured to detect first control information stored in said transponder, to compare said first control information with second control information stored in said transponder communication device, and to generate a vehicle control signal if said first control information corresponds to said second control information, and said transponder communication device receiving said first control information in a transponder signal, said steering wheel comprising:
   a peripheral ring portion; and
   a coil responsive to said transponder signal, said coil being comprised within said peripheral ring portion.
8. A steering wheel as claimed in claim 7, wherein said coil has been molded into said peripheral ring portion.
9. A steering wheel as claimed in claim 7, wherein said steering wheel has a hub portion, and at least one spoke mechanically coupling said hub portion to said peripheral ring portion, and wherein said coil has two connecting leads for connecting said coil to said transponder communication device, said connecting leads extending from said peripheral ring portion to said hub portion through said at least one spoke.
10. A vehicle comprising:
   a transponder communication device for contactless communication with a transponder, said transponder communication device being configured to detect first control information stored in said transponder, to compare said first controls information with second control information stored in said transponder communication device, and to generate a vehicle control signal if said first control information corresponds to said second control information, and said transponder communication device receiving said first control information in transponder signal;
   a steering wheel for steering said vehicle, said steering wheel having a peripheral ring portion; and
   a coil responsive to said transponder signal, said coil having been molded into said peripheral ring portion.
11. A vehicle comprising:
   a transponder communication device for contactless communication with a transponder, said transponder communication device being configured to detect first control information stored in said transponder, to compare said first control information with second control infor- mation stored in said transponder communication device, and to generate a vehicle control signal if said first control information corresponds to said second control information, and said transponder communication device receiving said first control information in a transponder signal;

a steering wheel for steering said vehicle, said steering wheel having a peripheral ring portion, and said steering wheel having a hub portion, and at least one spoke mechanically coupling said hub portion to said peripheral ring portion; and a coil responsive to said transponder signal, said coil being comprised within said peripheral ring portion, and said coil having two connecting leads for connecting said coil to said transponder communication device, said connecting leads extending from said peripheral ring portion to said hub portion through said at least one spoke.

12. A steering wheel for steering a vehicle, said vehicle having a transponder communication device for contactless communication with a transponder, said transponder communication device being configured to detect first control information stored in said transponder, to compare said first control information with second control information stored in said transponder communication device, and to generate a vehicle control signal if said first control information corresponds to said second control information, and said transponder communication device receiving said first control information in a transponder signal, said steering wheel comprising:

a peripheral ring portion; and a coil responsive to said transponder signal, said coil having been molded into said peripheral ring portion.

13. A steering wheel for steering a vehicle, said vehicle having a transponder communication device for contactless communication with a transponder, said transponder communication device being configured to detect first control information stored in said transponder, to compare said first control information with second control information stored in said transponder communication device, and to generate a vehicle control signal if said first control information corresponds to said second control information, and said transponder communication device receiving said first control information in a transponder signal, said steering wheel comprising:

a peripheral ring portion;

a hub portion, and at least one spoke mechanically coupling said hub portion to said peripheral ring portion; and a coil responsive to said transponder signal, said coil being comprised within said peripheral ring portion, and said coil having two connecting leads for connection of said coil to said transponder communication device, said connecting leads extending from said peripheral ring portion to said hub portion through said at least one spoke.

* * * * *

UNITED STATES PATENT AND TRADEMARK OFFICE
CERTIFICATE OF CORRECTION

PATENT NO.         : 6,232,871 B1
APPLICATION NO.    : 09/009745
DATED              : May 15, 2001
INVENTOR(S)        : Bernhard Spieß

It is certified that error appears in the above-identified patent and that said Letters Patent is hereby corrected as shown below:

On the title page item (75), please delete "Bernhard Spiess" and insert --Bernhard Spieß--.

Signed and Sealed this
Ninth Day of October, 2012

David J. Kappos
*Director of the United States Patent and Trademark Office*